United States Patent
Hsieh et al.

(10) Patent No.: US 12,037,448 B2
(45) Date of Patent: Jul. 16, 2024

(54) COPOLYMER AND METHOD OF MANUFACTURING THE SAME

(71) Applicant: INDUSTRIAL TECHNOLOGY RESEARCH INSTITUTE, Hsinchu (TW)

(72) Inventors: Feng-Jen Hsieh, Kaohsiung (TW); Kuan-Yeh Huang, Chiayi (TW); Yen-Ming Chen, New Taipei (TW); Yu-Chieh Chou, Zhudong Township (TW); Jyh-Jian Tai, Hsinchu (TW); Liang-Che Chen, Fuxing Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 354 days.

(21) Appl. No.: 17/134,769

(22) Filed: Dec. 28, 2020

(65) Prior Publication Data
US 2022/0106439 A1    Apr. 7, 2022

(30) Foreign Application Priority Data
Oct. 5, 2020 (TW) .................................. 109134376

(51) Int. Cl.
| | | |
|---|---|---|
| *C08G 63/08* | (2006.01) | |
| *C08G 63/183* | (2006.01) | |
| *C08G 63/189* | (2006.01) | |
| *C08G 63/685* | (2006.01) | |
| *C08G 63/78* | (2006.01) | |
| *C08G 63/85* | (2006.01) | |

(52) U.S. Cl.
CPC ........... *C08G 63/183* (2013.01); *C08G 63/08* (2013.01); *C08G 63/189* (2013.01); *C08G 63/685* (2013.01); *C08G 63/785* (2013.01); *C08G 63/85* (2013.01)

(58) Field of Classification Search
CPC ...... C08G 63/183; C08G 63/08; C08G 63/91; C08G 63/60; C08G 63/189; C08G 63/685; C08G 63/785; C08G 63/85
See application file for complete search history.

(56) References Cited

U.S. PATENT DOCUMENTS

| | | |
|---|---|---|
| 3,021,313 A | 2/1962 | Cox et al. |
| 5,468,837 A | 11/1995 | Wautier |
| 5,656,700 A | 8/1997 | Kägi et al. |
| 5,801,224 A | 9/1998 | Narayan et al. |
| 6,340,524 B1 | 1/2002 | Tang et al. |
| 6,613,257 B2 | 9/2003 | Tang et al. |
| 2002/0188067 A1 | 12/2002 | White et al. |
| 2006/0252864 A1* | 11/2006 | Yoshioka ................. C08K 5/36 524/505 |
| 2013/0236499 A1* | 9/2013 | Andjelic ................ C08G 63/08 528/355 |
| 2013/0324680 A1* | 12/2013 | Zhou ..................... C08G 63/60 525/450 |

FOREIGN PATENT DOCUMENTS

| | | |
|---|---|---|
| CN | 1814646 A | 8/2006 |
| CN | 101367914 A | 2/2009 |
| CN | 101367914 B | 1/2011 |
| CN | 101338023 B | 5/2011 |
| CN | 103102846 A | 5/2013 |
| CN | 109400838 A | 3/2019 |
| GB | 1076877 A | 7/1967 |
| JP | 60-252622 A | 12/1985 |
| JP | 63-113066 A | 5/1988 |
| JP | 1-272658 A | 10/1989 |
| JP | 8-41179 A | 2/1996 |

OTHER PUBLICATIONS

Lefevre, C.; Polymer, 2001, vol. 42, p. 8769-8777.*
Lefebvre, X.; Journal of Polymer Science Part B: Polymer Physics, 1999, vol. 37, p. 1-18.*
Lipik et al (International Journal of Biomaterials, vol. 2012, Article ID 390947) (Year: 2012).*
Taiwanese Office Action and Search Report for Taiwanese Application No. 109134376, dated Jul. 7, 2021.
Chinese Office Action and Search Report dated May 23, 2023 for Application No. 202110102163.0.

* cited by examiner

*Primary Examiner* — Robert S Jones, Jr.
*Assistant Examiner* — Jiangtian Xu
(74) *Attorney, Agent, or Firm* — Birch, Stewart, Kolasch & Birch, LLP

(57) ABSTRACT

A method of manufacturing copolymer includes mixing and reacting a polyester, an aliphatic polyol or an aliphatic polyol oligomer, and a first catalyst in a first region of a screw to form a polyester polyol, and side-feeding a lactone or a lactam to a second region of the screw to copolymerize the lactone or a lactam and the polyester polyol to form a copolymer, wherein the first region and the second region are continuous connecting regions.

18 Claims, No Drawings

COPOLYMER AND METHOD OF MANUFACTURING THE SAME

CROSS REFERENCE TO RELATED APPLICATIONS

The present application is based on, and claims priority from, Taiwan Application Serial Number 109134376, filed on Oct. 5, 2020, the disclosure of which is hereby incorporated by reference herein in its entirety.

TECHNICAL FIELD

The technical field relates to copolymers and method for manufacturing the same.

BACKGROUND

The polyethylene terephthalate (PET) has a melting point of 255° C. In general, a polyester with a lower melting point than 230° C. is classified as a low melting point polyester. In the textile industry, a low melting point polyester is a critical raw material for non-woven fabric produced by a hot-melt bonding process. The low melting point polyester can be used in upper varnish line and holt-melt adhesive. Most of the low melting point polyesters that are currently commercially available are formed by step-by-step polymerization, in which the terephthalic acid and ethylene glycol serve as raw materials, and several acids and/or alcohols (e.g. isophthalic acid, aliphatic diacid, neopentyl glycol, and the like) were added to the reaction tank in a batch to perform the polymerization. The disadvantages of this method include long reaction period, high cost, and a large amount of soft-segment molecules needs to be added, which may result in a low yield of the polycondensation reaction, and the polyester having a low molecular weight and poor mechanical properties. Accordingly, a novel method is needed to overcome the above disadvantages of the described low melting point polyester to meet the requirements that manufacturing be affordable and fast.

SUMMARY

One embodiment of the disclosure provides a method of manufacturing copolymers that includes the following steps: mixing and reacting a polyester, an aliphatic polyol or an aliphatic polyol oligomer, and a first catalyst in a first region of a screw to form a polyester polyol, and side-feeding a lactone or a lactam to a second region of the screw to copolymerize the lactone or a lactam and the polyester polyol to form a copolymer, wherein the first region and the second region are continuous connecting regions.

One embodiment of the disclosure provides a copolymer, being formed by copolymerizing lactone or lactam with a polyester polyol, wherein the polyester polyol is formed by reacting a polyester with an aliphatic polyol or an aliphatic polyol oligomer in the presence of a first catalyst.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a method of forming copolymer, including providing a screw. The screw can be a screw of a screw extruder or a twin screw extruder, and two ends of the screw are main inlet and outlet, respectively. The interior of the screw can be roughly defined as continuous connecting first and second regions. The first region can be disposed between the main inlet and the second region. For example, a polyester, an aliphatic polyol or an aliphatic polyol oligomer, and a first catalyst cab be mixed and reacted in the first region of the screw to form the polyester polyol.

For example, if the polyester is polyethylene terephthalate (PET), and the aliphatic polyol is aliphatic diol, PET and the aliphatic diol will react in the presence of a catalyst to form a polyester diol as shown below:

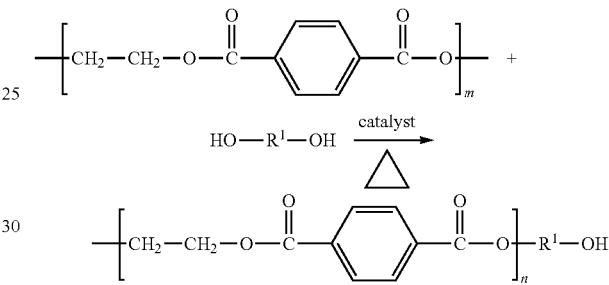

The reaction belongs to de-polymerization, such that m>n.

Subsequently, lactone or lactam can be side-fed to the second region of the screw, and the lactone or lactam may react with the polyester diol to form a copolymer. In some embodiments, the lactone can be $C_{2-7}$ lactone, and the lactam can be $C_{2-7}$ lactam. For example, if the lactone is R (e.g. H or alkyl group) substituted ε-caprolactone, the above reaction in the presence of a catalyst is shown below:

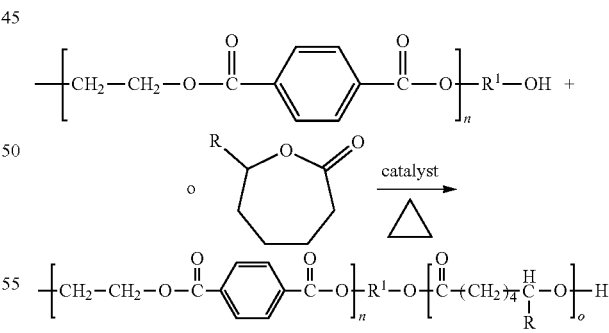

For example, if lactam is caprolactam, the above reaction in the presence of a catalyst is shown below:

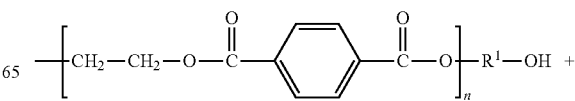

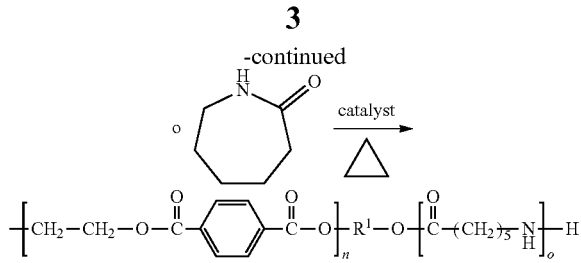

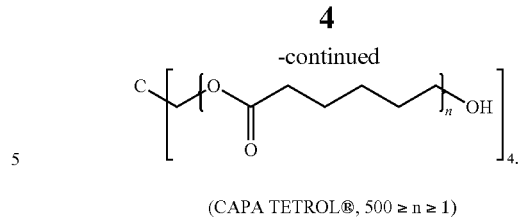

(CAPA TETROL®, 500 ≥ n ≥ 1)

The copolymer formed by the above reaction will have a dramatically lower melting point than a general polyester. Take PET as an example, which has a melting point of about 250° C. The copolymer formed by the above method may have a melting point that is dramatically decreased to lower than 220° C., such as lower than 200° C., lower than about 180° C. or lower, or even decreased to about 150° C. The copolymer is beneficial to be co-processed with another resin, thereby broadening its application. In some embodiments, the copolymer has a melting point of 120° C. to 220° C. In some embodiments, the copolymer has a melting point of 120° C. to 200° C. In some embodiments, the copolymer has a melting point of 120° C. to 180° C.

In some embodiments, the polyester may include polyethylene terephthalate, polybutylene terephthalate, polycarbonate, polyethylene naphthalate, polybutylene naphthalate, polylactate, polybutyrate-adipate-terephthalate, polyurethane, or a combination thereof.

In some embodiments, the aliphatic polyol is $C-(R^1-OH)_x$, in which x=2-42, C is a core of a carbon atom or a carbon chain, and $R^1$ is $C_{2-20}$ alkylene group, polyester group, or cycloalkylene group. It should be understood when x is 2, the aliphatic polyol is aliphatic diol, which can be oligomer and reacted with polyester to form polyester diol; when x is 3, the aliphatic polyol is aliphatic triol, which can be oligomer and reacted with polyester to form polyester triol; when x is 4, the aliphatic polyol is aliphatic tetraol, which can be oligomer and reacted with polyester to form polyester tetraol, and so on. In some embodiments, the aliphatic polyol can be aliphatic diol, aliphatic triol, aliphatic tetraol, an oligomer thereof, or a combination thereof. For example, the aliphatic polyol can be

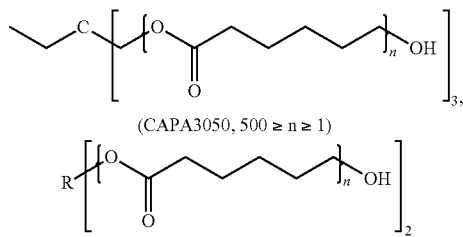

(CAPA2054, R is $C_{2-20}$ alkylene group, polyester group, or cycloalkylene group, and 500≥n≥1), In some embodiments, the aliphatic diol is $H(OCH_2CH_2)_n$OH or $H(OCH_2CH_2CH_2)_n$OH, wherein 500≥n≥2.

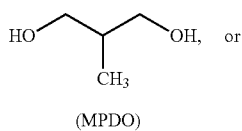

(MPDO)

In some embodiments, the first catalyst can be a metal alkoxide. For example, the first catalyst is $M(OR^2)_x$, x=3 or 4, M is Al, Ti, Zn, Sb, Ge, Sn, or a combination thereof, and $R^2$ is $C_{1-6}$ linear or branched alkyl group. In some embodiments, the copolymer is formed by further side feeding a second catalyst to the second region of the screw, and the second catalyst can be a metal alkoxide. For example, the second catalyst is $M(OR^2)_x$, x=3 or 4, M is Al, Ti, Zn, Sb, Ge, Sn, or a combination thereof, and $R^2$ is $C_{1-6}$ linear or branched alkyl group. In other words, the second catalyst (being the same as or different from the first catalyst) can be side-fed into the second region to ensure that there is a sufficient amount of catalyst during the reaction of the lactone (or lactam) and the polyester polyol.

In some embodiments, the temperature of the first region and the second region in the screw should be about 90° C. to about 300° C. In general, the temperature of the first region and the second region is slightly higher than the melting point of the polyester. If the temperature of the first region is too low, the polyester will not be completely melted, such that the reactivity is poor. If the temperature of the first region and the second region is too high, the polyester will be cracked.

In some embodiments, the total reaction period in the first region and the second region of the screw is about 5 minutes to 15 minutes. In some embodiments, the weight of the polyester and the weight of the aliphatic polyol or the aliphatic polyol oligomer have a ratio of 100:1 to 100:50. If the amount of the aliphatic polyol or the aliphatic polyol oligomer is too low, the melting point of the product (copolymer) will not be obviously lowered. If the amount of the aliphatic polyol or the aliphatic polyol oligomer is too high, the melting point of the product (copolymer) will be obviously lowered, but the physical properties of the product (copolymer) will be too poor to be processed and utilized and the economical effect will be low (due to high manufacture cost). In some embodiments, the weight of the polyester and the weight of the lactone or the lactam have a ratio of 100:1 to 100:50. If the amount of the lactone or the lactam is too low, the melting point of the product (copolymer) will not be obviously lowered. If the amount of the lactone or the lactam is too high, the product (copolymer) cost will be too high.

In some embodiments, the polyester may have an inherent viscosity of 0.1 dL/g to 2.0 dL/g. The appropriate range of the inherent viscosity for the polyester depends on the final application of the polyester. For example, if the polyester will be applied as gel material, the polyester should have an inherent viscosity of greater than 0.1 dL/g. However, if the polyester will be applied in fiber textile, the polyester should have an inherent viscosity of 0.4 dL/g to 0.98 dL/g. Furthermore, if the polyester will be applied as bottle-grade material, the polyester should have an inherent viscosity of greater than 0.7 dL/g. In other words, the polyester has an inherent viscosity of 0.7 dL/g to 2.0 dL/g. If the inherent viscosity of the polyester is too low, the polyester will lack required physical properties and cannot be processed to be utilized.

The method of the disclosure may lower the melting point of the copolymer, and simultaneously maintain the inherent viscosity of the copolymer in an appropriate range. In some embodiments, the polyester (e.g. PET) has a melting point of about 250° C., and the copolymer formed by the above method may have a melting point that is dramatically reduced to lower than 220° C. or lower than 200° C. Moreover, the inherent viscosity of the copolymer can be maintained as 0.1 dL/g to 2 dL/g, or even 0.4 dL/g to 1.2 dL/g. The method of the disclosure may address the issues (e.g. overly long reaction period and high cost) of the step-by-step polymerization method for manufacturing low melting point polyester in the current industry.

It should be understood that the disclosure provides a copolymer, which can be formed by copolymerizing a lactone (or lactam) with a polyester polyol, wherein the polyester polyol is formed by reacting a polyester with an aliphatic polyol or an aliphatic polyol oligomer in the presence of a first catalyst. The reaction can be performed in the screw as described above, or performed in a batch-type method. The polyester, the aliphatic polyol or the aliphatic polyol oligomer, the first catalyst, the lactone (or the lactam), and the reaction temperature and period are similar to those described above, and the related description is not repeated here. Similarly, the copolymer formed by the above method has a dramatically lowered melting point. In addition, the copolymer has a certain degree of inherent viscosity, and the mechanical properties of the copolymer will not be degraded with its dramatically lowered melting point.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

100 g of PET (IV=0.62 dL/g measured by the standard ASTM D4603, melting point of 250.0° C., commercially available from SHINKONG SYNTHETIC FIBERS CORP.), 0.5 g of titanium (IV) isopropoxide (commercially available from Alfa Aesar, CAS #546-68-9) serving as catalyst, and 10 g of 2-methyl-propan-1,3-diol (MPDO) serving as diol were directly fed into a first region of a screw of a twin-screw extruder from a main inlet, and then reacted at 260° C. to form polyester diol. The temperature of the main inlet of the screw was 20° C., the extrusion temperature was 260° C., and the screw rotation rate was 200 rpm. The polyester diol was extruded, pulled as a strip through water, and then pelletized. The pelletized polyester diol was put into an oven to be dried at 100° C. for 4 hours. The obtained polyester diol had an inherent viscosity of 0.11 dL/g (measured by the standard ASTM D4603) and a melting point of 207.8° C.

Example 2

100 g of PET (IV=0.62 dL/g measured by the standard ASTM D4603, melting point of 250.0° C., commercially available from SHINKONG SYNTHETIC FIBERS CORP.) was directly fed into a screw of a twin-screw extruder from a main inlet. In addition, 0.5 g of titanium (IV) isopropoxide serving as catalyst and 20 g of c-caprolactone (CPL, commercially available from Alfa Aesar, CAS #502-44-3) were side-fed into the screw of the twin-screw extruder from a side inlet. PET and CPL then reacted at 260° C. to form a copolyester. The temperature of the main inlet of the screw was 20° C., the temperature of the side inlet was 20° C., the extrusion temperature was 260° C., and the screw rotation rate was 200 rpm. The copolyester was extruded, pulled as a strip through water, and then pelletized. The pelletized copolyester was put into an oven to be dried at 100° C. for 4 hours. The obtained copolyester had an inherent viscosity of 0.50 dL/g (measured by the standard ASTM D4603) and a melting point of 215.0° C.

Example 3

100 g of PET (IV=0.62 dL/g measured by the standard ASTM D4603, melting point of 250.0° C., commercially available from SHINKONG SYNTHETIC FIBERS CORP.), 0.5 g of titanium (IV) isopropoxide serving as catalyst, and 10 g of MPDO were directly fed into a first region of a screw of a twin-screw extruder from a main inlet, and then reacted at 260° C. to form polyester diol. In addition, 20 g of CPL was side-fed into a second region (separated from the main inlet by the first region) of the screw of the twin-screw extruder from a side inlet. The polyester diol and CPL then reacted at 260° C. to form a copolyester. The temperature of the main inlet of the screw was 20° C., the temperature of the side inlet was 20° C., the extrusion temperature was 260° C., and the screw rotation rate was 200 rpm. The copolyester was extruded, pulled as a strip through water, and then pelletized. The pelletized copolyester was put into an oven to be dried at 100° C. for 4 hours. The obtained copolyester had an inherent viscosity of 0.16 dL/g (measured by the standard ASTM D4603) and a melting point of 154.3° C. As known from the comparison between Examples 1 to 3, the melting points of the copolyester formed by directly copolymerizing PET and CPL and the polyester diol formed by reacting PET and MPDO were slightly lowered. On the other hand, PET and MPDO reacted to form the polyester diol, and then reacted with CPL could form a copolyester having a dramatically lowered melting point.

Example 4

1.0 kg of PET (IV=0.62 dL/g measured by the standard ASTM D4603, melting point of 250.0° C., commercially available from SHINKONG SYNTHETIC FIBERS CORP.), 0.5 g of titanium (IV) isopropoxide serving as catalyst, and 100 g of diol oligomer (CAPA®2054, commercially available from Perstorp, Mw=550) were directly fed into a first region of a screw of a twin-screw extruder from a main inlet, and then reacted at 260° C. to form polyester diol. In addition, 200 g of CPL was side-fed into a second region (separated from the main inlet by the first region) of the screw of the twin-screw extruder from a side inlet. The polyester diol and CPL then reacted at 260° C. to form a copolyester. The temperature of the main inlet of the screw was 20° C., the temperature of the side inlet was 20° C., the extrusion temperature was 260° C., and the screw rotation rate was 200 rpm. The copolyester was extruded, pulled as a strip through water, and then pelletized. The pelletized copolyester was put into an oven to be dried at 100° C. for 4 hours. The obtained copolyester had an inherent viscosity of 0.58 dL/g (measured by the standard ASTM D4603) and a melting point of 194.8° C. As known from Examples 3 and 4, PET and MPDO reacted to form the polyester diol, and then reacted with CPL could form a copolyester having a lower melting point.

Example 5

100 g of PET (IV=0.62 dL/g measured by the standard ASTM D4603, melting point of 250.0° C., commercially available from SHINKONG SYNTHETIC FIBERS CORP.), 0.5 g of titanium (IV) isopropoxide serving as catalyst, and 5 g of triol (CAPA®3050, commercially available from Perstorp, MW=500) were directly fed into a first region of a screw of a twin-screw extruder from a main inlet, and then reacted at 260° C. to form polyester triol. In addition, 20 g of CPL was side-fed into a second region (separated from the main inlet by the first region) of the screw of the twin-screw extruder from a side inlet. The polyester triol and CPL then reacted at 260° C. to form a copolyester. The temperature of the main inlet of the screw was 20° C., the temperature of the side inlet was 20° C., the extrusion temperature was 260° C., and the screw rotation rate was 200 rpm. The copolyester was extruded, pulled as a strip through water, and then pelletized. The pelletized copolyester was put into an oven to be dried at 100° C. for 4 hours. The obtained copolyester had an inherent viscosity of 0.51 dL/g (measured by the standard ASTM D4603) and a melting point of 178° C.

Example 6

100 g of PET (IV=0.62 dL/g measured by the standard ASTM D4603, melting point of 250.0° C., commercially available from SHINKONG SYNTHETIC FIBERS CORP.), 0.5 g of titanium (IV) isopropoxide serving as catalyst, 5 g of polyethylene glycol 8000 (commercially available from Alfa Aesar, MW=8,000), and 0.05 g of process oil were directly fed into a first region of a screw of a twin-screw extruder from a main inlet, and then reacted at 260° C. to form polyester diol. In addition, 20 g of CPL was side-fed into a second region (separated from the main inlet by the first region) of the screw of the twin-screw extruder from a side inlet. The polyester diol and CPL then reacted at 260° C. to form a copolyester. The temperature of the main inlet of the screw was 20° C., the temperature of the side inlet was 20° C., the extrusion temperature was 260° C., and the screw rotation rate was 200 rpm. The copolyester was extruded, pulled as a strip through water, and then pelletized. The pelletized copolyester was put into an oven to be dried at 100° C. for 4 hours. The obtained copolyester had an inherent viscosity of 0.55 dL/g (measured by the standard ASTM D4603) and a melting point of 226° C.

Example 7

100 g of PET (IV=0.62 dL/g measured by the standard ASTM D4603, melting point of 250.0° C., commercially available from SHINKONG SYNTHETIC FIBERS CORP.), 0.5 g of titanium (IV) isopropoxide serving as catalyst, and 5 g of diol MPDO were directly fed into a first region of a screw of a twin-screw extruder from a main inlet, and then reacted at 260° C. to form polyester diol. In addition, 40 g of CPL was side-fed into a second region (separated from the main inlet by the first region) of the screw of the twin-screw extruder from a side inlet. The polyester diol and CPL then reacted at 260° C. to form a copolyester. The temperature of the main inlet of the screw was 20° C., the temperature of the side inlet was 20° C., the extrusion temperature was 260° C., and the screw rotation rate was 200 rpm. The copolyester was extruded, pulled as a strip through water, and then pelletized. The pelletized copolyester was put into an oven to be dried at 100° C. for 4 hours. The obtained copolyester had an inherent viscosity of 0.16 dL/g (measured by the standard ASTM D4603) and a melting point of 137° C.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A copolymer, being:
    formed by copolymerizing lactone or lactam with a polyester polyol,
    wherein the polyester polyol is formed by reacting a polyester with an aliphatic polyol or an aliphatic polyol oligomer in the presence of a first catalyst,
    wherein the aliphatic polyol is not present in the polyester, and
    wherein the polyester comprises polyethylene terephthalate, polybutylene terephthalate, polycarbonate, polyethylene naphthalate, polybutylene naphthalate, polybutyrate-adipate-terephthalate, or a combination thereof.

2. The copolymer as claimed in claim 1, wherein the aliphatic polyol is $C-(R^1-OH)_x$, wherein x=2-42, C is core of a carbon atom or a carbon chain, and $R^1$ is $C_{2-20}$ alkylene group, polyester group, or cycloalkylene group.

3. The copolymer as claimed in claim 1, wherein the aliphatic polyol is

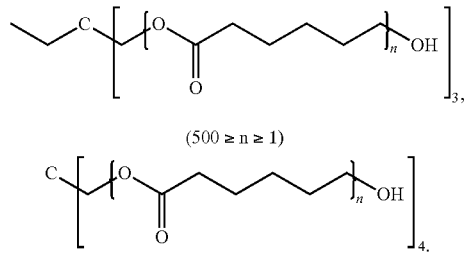

(R is $C_{2-20}$ alkylene group, polyester group, or cycloalkylene group, and 500≥n≥1),

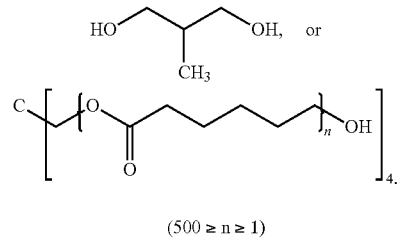

4. The copolymer as claimed in claim 1, wherein the aliphatic polyol is $H(OCH_2CH_2)_nOH$ or $H(OCH_2CH_2CH_2)_nOH$, wherein 500>n≥2.

5. The copolymer as claimed in claim 1, wherein the first catalyst is metal alkoxide.

6. The copolymer as claimed in claim 1, wherein the weight of the polyester and the weight of the aliphatic polyol or the aliphatic polyol oligomer have a ratio of 100:1 to 100:50.

7. The copolymer as claimed in claim 1, wherein the weight of the polyester and the weight of the lactone or the lactam have a ratio of 100:1 to 100:50.

8. The copolymer as claimed in claim 1, wherein the copolymer has a melting point of 120° C. to 220° C.

9. The copolymer as claimed in claim 1, wherein the polyester has an inherent viscosity of 0.1 dL/g to 2 dL/g, and the copolymer has an inherent viscosity of 0.1 dL/g to 2 dL/g.

10. A method of manufacturing the copolymer according to claim 1, comprising: mixing and reacting a polyester, an aliphatic polyol or an aliphatic polyol oligomer, and a first catalyst in a first region of a screw to form a polyester polyol, and side-feeding a lactone or a lactam to a second region of the screw to copolymerize the lactone or a lactam and the polyester polyol to form a copolymer, wherein the first region and the second region are continuous connecting regions.

11. The method as claimed in claim 10, wherein the aliphatic polyol is C—(R$^1$—OH)$_x$, wherein x=2-42, C is core of a carbon atom or a carbon chain, and R$^1$ is C$_{2-20}$ alkylene group, polyester group, or cycloalkylene group.

12. The method as claimed in claim 10, wherein the aliphatic polyol is

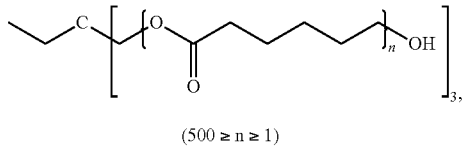

(500 ≥ n ≥ 1)

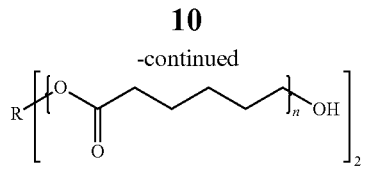

(R is C$_{2-20}$ alkylene group, polyester group, or cycloalkylene group, and 500≥n≥1),

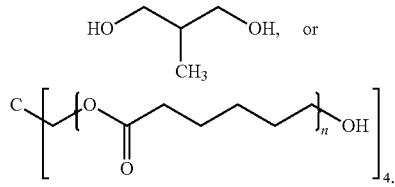

(500 ≥ n ≥ 1)

13. The method as claimed in claim 10, wherein the first catalyst is metal alkoxide.

14. The method as claimed in claim 10, further comprising side-feeding a second catalyst to the second region of the screw, and the second catalyst is metal alkoxide.

15. The method as claimed in claim 10, wherein the weight of the polyester and the weight of the aliphatic polyol or the aliphatic polyol oligomer have a ratio of 100:1 to 100:50.

16. The method as claimed in claim 10, wherein the weight of the polyester and the weight of the lactone or the lactam have a ratio of 100:1 to 100:50.

17. The method as claimed in claim 10, wherein the copolymer has a melting point of 120° C. to 220° C.

18. The method as claimed in claim 10, wherein the polyester has an inherent viscosity of 0.1 dL/g to 2 dL/g, and the copolymer has an inherent viscosity of 0.1 dL/g to 2 dL/g.

\* \* \* \* \*